United States Patent [19]

Glass

[11] Patent Number: 4,755,944

[45] Date of Patent: Jul. 5, 1988

[54] METHOD FOR OBTAINING DIELECTRIC CONSTANT AND CONDUCTIVITY INFORMATION ON SUBSOIL STRUCTURE USING CONTINUOUS COMPLEX GEOTOMOGRAPHY

[75] Inventor: Charles E. Glass, Tucson, Ariz.

[73] Assignee: Terragraf, Inc., Tucson, Ariz.

[21] Appl. No.: 851,442

[22] Filed: Apr. 14, 1986

[51] Int. Cl.$^4$ ............................................. G01N 29/00
[52] U.S. Cl. ..................................... 364/422; 73/151; 324/372; 367/57
[58] Field of Search ................ 364/422; 181/101, 102; 367/36, 57, 27; 73/151; 324/338, 323, 372

[56] References Cited

U.S. PATENT DOCUMENTS

| | | | |
|---|---|---|---|
| 4,209,747 | 6/1980 | Huchital | 324/328 |
| 4,214,226 | 7/1980 | Narasimhan et al. | 367/27 |
| 4,298,967 | 11/1981 | Hawkins | 367/57 |
| 4,562,540 | 12/1985 | Devaney | 364/422 X |
| 4,594,662 | 6/1986 | Devaney | 364/422 X |
| 4,598,366 | 7/1986 | Devaney | 364/422 X |

FOREIGN PATENT DOCUMENTS 1078388  3/1984  U.S.S.R. .............................. 324/372

OTHER PUBLICATIONS

Richmond, E. et al. "Future Exploration Techniques for the Coal Mining Industry", *Queensland Govt. Mining Journal*, vol. 86, No. 1005, Aug. 1985, 321-327.
Pan, S. X. et al. "A Computational Study of Reconstruction Algorithms for Diffraction Tomography: Interpolation vs. Filtered Backpropagation", *IEEE Trans. on Acoustics, Speech and Signal, Processing*, vol. ASSP-31, No. 5, Oct. 1983, 1262-1275.
K. Dines and R. J. Lytle, "Computerized Geophysical Tomography," *Proc. IEEE*, vol. 67, No. 7, pp. 1065-1073 (1979).
"Controlled Source Geotomography Using a Circular Array," G. L. Pavlis, *Transactions, American Geophysical Union*, vol. 66, No. 18, p. 303ff (1985).
"The Use of Computer-Assisted Tomography to Determine Spatial Distribution of Soil Water Content," J. M. Hainsworth, *Australian Journal of Soil Research*, vol. 21, No. 4, pp. 435-443 (1983).

(List continued on next page.)

Primary Examiner—Jerry Smith
Assistant Examiner—Clark A. Jablon
Attorney, Agent, or Firm—Phillips, Moore, Lempio & Finley

[57] ABSTRACT

The present invention relates to an economical, high resolution non-destructive method to remotely image rock mass and subsoil features. More specifically, the invention relates to a method measuring the properties of subsoil structure by first creating at least two boreholes in the area to be examined. At least one electromagnetic radiation transmitter is placed in one borehole and at least one receiver is placed in a second at least one other borehole. The transmitter produces a continuous constant signal of about 100 Hz or greater, which traverses the plane between the transmitter and receiver. After measuring simultaneously both the amplitude and phase of the received electromagnetic signal, the signal information is processed using a linear approximation algorithm. Upon comparison of the processed data, with standard data for nearby geological formations, it is possible to accurately determine both the dielectric constant and the conductivity of the subsoil in the plane. The method is useful to determine the salinity and quantity of water present in a particular defined region. It is also useful in the construction of any building or structure where permanent contact with the subsoil at levels below ground is present. It is also useful to monitor on a continuous basis for example, an operating in situ oil shale retort, locating pools of underground petroleum, locating coal deposits, locating fractures or faults and describing leaking underground or above-ground gasoline and chemical storage tanks, contaminant plumes emanating from waste impoundments, spills of hazardous liquid materials, and the like.

24 Claims, 9 Drawing Sheets

OTHER PUBLICATIONS

"Two-Dimensional Velocity Anomaly Reconstruction by Seismic Tomography," Wattrus, N.J., Doctoral Thesis at the University of Minnesota (Duluth) 1984 U. of Michigan.

"Exploration Technology Development Program of Board of Industrial Leadership and Development: Summary of Research 1984–1985, Milne, V. G. et al., *Ontario Geological Survey Miscellaneous Paper 125*, Ontario, Canada, p. 37–34 (1985).

"Seismic Tomography of Boreholes," McMechan, G. A., *Geophysical Journal of the Royal Astronomical Society*, vol. 74, No. 2, pp. 601–612 (1983).

"A Stable Geotomography Techniques of Refractive Media," Radcliff, R. D. et al., *IEEE Transactions Geoscience Remote Sensing (NY)*, vol. 22, No. 6, pp. 698–699 (1984).

"INdirect Rock Mass Investigations for Optimizing Borehole Drilling Programs: Wave Diffusion Geotomography," NUREG/CR-3143, vol. 4, A. Q. Howard, Jr. et al., Oct. 1983.

"High Resolution Geotechnical Exploration Using Wave-Diffusion Geotomography," Charles E. Glass et al., USAF Ballistic Missile Office, Norton AFB, CA, Mar. 1986.

"Efficient Parallel Solution of Linear Systems," *Proceedings*, pp. 143–152, May 1985.

FIELD EMPLACEMENT OF COMPLEX GEOTOMOGRAPHY APPARATUS
FOR MONITORING LEAKAGE FROM UNDERGROUND STORAGE TANK

FIGURE 2

| | | | | | |
|---|---|---|---|---|---|
| 1 | | | | | 6 |
| 18/.098 | 20.4/0.11 | 9.3/.018 | 10.6/.025 | 19/0.10 | 18/.098 |
| 18/.098 | 19/.09 | 6.61/.007 | 6.61/.007 | 23/0.14 | 18/.098 |
| 20/0.11 | 19.4/.09 | 6.61/.007 | 6.61/.007 | 22.7/.13 | 18/.098 |
| 20/0.11 | 24.3/0.15 | 10.7/.025 | 16.1/.061 | 25.3/0.17 | 18/.098 |
| 20/.011 | 26.0/0.18 | 28.7/0.22 | 28/0.20 | 23.1/0.14 | 18/.098 |
| 31 18/.098 | 21.6/0.13 | 24.5/0.16 | 23.5/0.17 | 19.6/0.11 | 36 18/.098 |

DIELECTRIC CONSTANT / CONDUCTIVITY (mHo's/m)

METHOD FOR OBTAINING DIELECTRIC CONSTANT AND CONDUCTIVITY INFORMATION ON SUBSOIL STRUCTURE USING CONTINUOUS COMPLEX GEOTOMOGRAPHY

ORIGIN OF THE INVENTION

The invention described herein was made in the performance of a U.S. Air Force contract (as a Small Business Innovation Research Program, Phase I) and is subject to the provisions of Public Law 96-517 (35 U.S.C. §200 et seq.). The contractor has elected to retain rights in the invention.

BACKGROUND OF THE INVENTION

1. Field of the Invention

The present invention relates to a method of and a system for deriving information regarding subsoil and rock structure. More particularly, the invention relates to a method and to a system for obtaining at least a two-dimensional plot of subsoil structure and the physical properties thereof, using complex geotomography. The method is used to obtain, for example, conductivity and dielectric constant values of the subsoil in the plane between two or more bore holes.

2. Description of the Related Art

Knowledge of the physical properties of the subsoil structure (stratigraphy) in an area is very useful to predict the condition and components of the soil. The information generated when interpreted is useful to determine the location of underground petroleum, oil shale, coal, mineral deposits, location of contaminants (such as hazardous chemicals, gasoline), location of fractures and faults, and the like. Having a multi-dimensional plot or graph of the subsoil and bedrock structure with sufficiently high resolution enables display of the relative locations of both small and large structures and layers.

Tomography was originally defined to denote an analytic method of X-ray photography in which cross-sectional planes are imaged without interference from adjacent planes. Since the first practical applications to medical diagnostics, tomography has evolved to include reconstruction using frequencies other than X-ray, such as those from acoustic or electromagnetic radiation.

Tomography was first used to reconstruct cross-sections in the earth by D. L. Lager and R. J. Lytle, "Computer Algorithms Useful for Determining the Subsurface Electrical Profile Via High Frequency Probing," Lawrence Livermore National Laboratory (LLNL), Livermore, Calif., Report No. UCRL-51748 (1975). Additional reports of the use of geotomography have applied medical X-ray reconstruction algorithms to earth and subsoil imaging. These include, for example: K. Dines and R. J. Lytle, "Computerized Geophysical Tomography," *Proc. IEEE,* Vol. 67, No. 7, pp. 1065–1073 (1979); D. L. Lager and R. J. Lytle, "Determining a Subsurface Electromagnetic Profile from High Frequency Measurements by Applying Reconstruction Techniques Algorithms," *Radio Science,* Vol. 12, No. 2, pp. 249–260 (1977); R. J. Lytle, et al., "Electromagnetic Cross-Borehole Survey of a Site Proposed for a Future Urban Transit Station," LLNL Report No. UCRL-52484 (1978).

In U.S. Pat. No. 4,214,226, K. Narasimhan et al. disclose a method for obtaining high resolution data regarding the subsoil structure between two spaced apart boreholes. Their method includes the steps of placing a number of signal sources at preselected distances from one another in one borehole, placing a number of signal detectors at preselected distances in at least a second borehole, activating the sources in a selected sequence, receiving at each of the detectors the signal which propagates to the detectors through the subsoil structure as a result of each activated source, and processing the signals received at each detector as a result of the activation of the sources. This method usually includes one-time signals at frequencies greater than 160 Hz up to about 1000 Hz to obtain the data adapted to produce subsoil structure information of incremental areas on the order of $\lambda/3$ for producing a tomograph of the substructure between the boreholes, where $\lambda$ is the wavelength of the processed signals. The reference tracks only explosive signals and seismic waves produced by the detonation of an explosive charge at different locations. Only a one-time signal is obtained from each source which is measured for amplitude and/or velocity. Once the destructive explosive charge has detonated, that region and the regions below the explosive charge can no longer be monitored on a repetitive basis. The patent does not teach the use of a radiation transmitter which produces a continuous signal which can be detected and measured for both amplitude and phase. On the other hand the borehole used in the present invention is not destroyed and can be used to monitor the subsoil again and again over a period of time.

Additional art of general interest include, for example:

"Controlled Source Geotomography Using a Circular Array," by G. L. Pavlis in *Transactions, American Geophysical Union,* Vol. 66, No. 18, pp. 303ff (1985);

"Application of Computed Tomography to Geological Investigation," by H. Sugawara et al. in *Soil Mechanics and Foundation Engineering (Japan),* Vol. 33, No. 7, Ser. No. 330, pp. 53–56 (1985);

"The Use of Computer-Assisted Tomography to Determine Spatial Distribution of Soil Water Content," by J. M. Hainsworth, *Australian Journal of Soil Research,* Vol. 21, No. 4, pp. 435–443 (1983);

"Geophysical Diffraction Tomography," by A. J. Devaney in a special issue on Electromagnetic Methods in Applied Geophysics, edited by A. Q. Howard, Jr., *IEEE Transactions on Geoscience and Remote Sensing,* GE-22:1 (1984);

"Future Exploration Techniques for the Coal Mining Industry," by A. Richmond, *Queensland Government Mining Journal,* Vol. 86, No. 1005, pp. 321–327 (1985);

"Two-Dimensional Velocity Anomaly Reconstruction by Seismic Tomography," N. J. Wattrus, Doctoral Thesis at the University of Minnesota (Duluth) 1984 [Available from Dissertation Abstracts, University Microfilms, Ann Arbor, Mich.];

"Resolution and Error of the Back Projection Technique Algorithm for Geophysical Tomography," by N. R. Burkhard, URCL 52984 (1980)(available from U.S. Nat. Tech. Info. Serv., Springfield, Va.;

"Exploration Technology Development Program of the Board of Industrial Leadership and Development: Summary of Research 1984–1985 by V. G. Milne (ed) and R. B. Barlow (ed) *Ontario Geological Survey Miscellaneous Paper* 125, Ontario Geological Survey, Ontario, Canada, pp. 37–44 (1985);

"Seismic Tomography of Boreholes," by G. A. McMechan, *The Geophysical Journal of the Royal Astronomical Society*, Vol. 74, No. 2, pp. 601–612 (1983); and "A Stable Geotomography Technique for Refractive Media," by R. D. Radcliff, *IEEE Transactions Geoscience Remote Sensing (NY)*, Vol. 22, No. 6, pp. 698–699 (1984).

The reconstruction data found in the above patents and most of the articles are based on the assumption that the energy travels in a straight line from the source of the receiver in the same manner as X-rays do in medical applications (ray-optic). This assumption is not correct, however, for frequencies low enough to penetrate the earth. Previous attempts have been made to try to correct this assumption using geometrical optics, back propogation, and ray tracing methods, however, these corrections have only limited success.

Further, the previous approaches have neglected the effect of wave diffusion. Previous geotomography applications have made measurements of wave amplitude (electromagnetic and acoustic applications) to reconstruct an image of attenuation-per-unit length, or have measured wave velocity (acoustic). These attenuation-per-unit length geotomography reconstructions, although related in a complex way to electric or elastic parameters of the earth, cannot be used to accurately derive such parameters.

It is therefore very desirable to have a non-destructive method for obtaining high resolution information of subsoil structure between two or more boreholes by measuring the amplitude and phase of a continuously transmitted signal, wherein the signal can be received, measured, processed and correlated to useful physical property measurements of the subsoil, particularly dielectric constant and conductivity in the case of electromagnetic signals, and elastic moduli values in the case of seismic signals.

SUMMARY AND OBJECTS OF THE INVENTION

The present invention relates to an improved method for obtaining high resolution information regarding the properties of subsoil structure in the plane between two or more spaced apart boreholes, which method comprises:

placing at least one electromagnetic radiation transmitter in at least one borehole;

placing at least one electromagnetic radiation receiver in at least one of the other boreholes;

activating the at least one of the electromagnetic radiation transmitter using a continuous frequency of 100 Hz or greater;

receiving continuously at the at least one electromagnetic radiation receiver, the electromagnetic radiation signal which originates from the transmitter of the electromagnetic radiation;

processing the reduced electromagnetic radiation signal continuously received at least at one receiver as a result of the transmission of the at least one transmitter; and measuring both the amplitude and phase of the received electromagnetic signal.

It is the primary object of the present invention to provide a method for obtaining useful data related to subsoil structure.

Another object of this invention is to provide a system for obtaining useful data related to subsoil structure from which a multi-dimensional graph of the subsoil between two or more boreholes can be produced.

Another object of the present invention is to provide a non-destructive monitoring technique to obtain useful data related to subsoil and rock structure and physical properties.

Yet another object of this invention is to provide a method of deriving conductivity and dielectric constant data of subsoil structure.

A further object of the present invention is to provide a method of deriving data related to dynamic sheer modulus and dynamic Young's modulus of subsoil and rock structure.

A further object of the invention is to provide a method of deriving data of subsoil to assist in determining location, volume, and/or concentration of coal deposits, oil shale deposits, petroleum deposits, organic chemical contaminants, inorganic chemical contaminants, moisture, salinity, fractures, joints and the like.

BRIEF DESCRIPTION OF THE DRAWINGS

FIG. 2 is a combined table diagram which shows the expected dielectric constant and conductivity values for the patches in the plane between the boreholes of FIG. 1 where gasoline has leaked into the subsoil.

DETAILED DESCRIPTION OF THE INVENTION AND PREFERRED EMBODIMENTS

Figure 1:
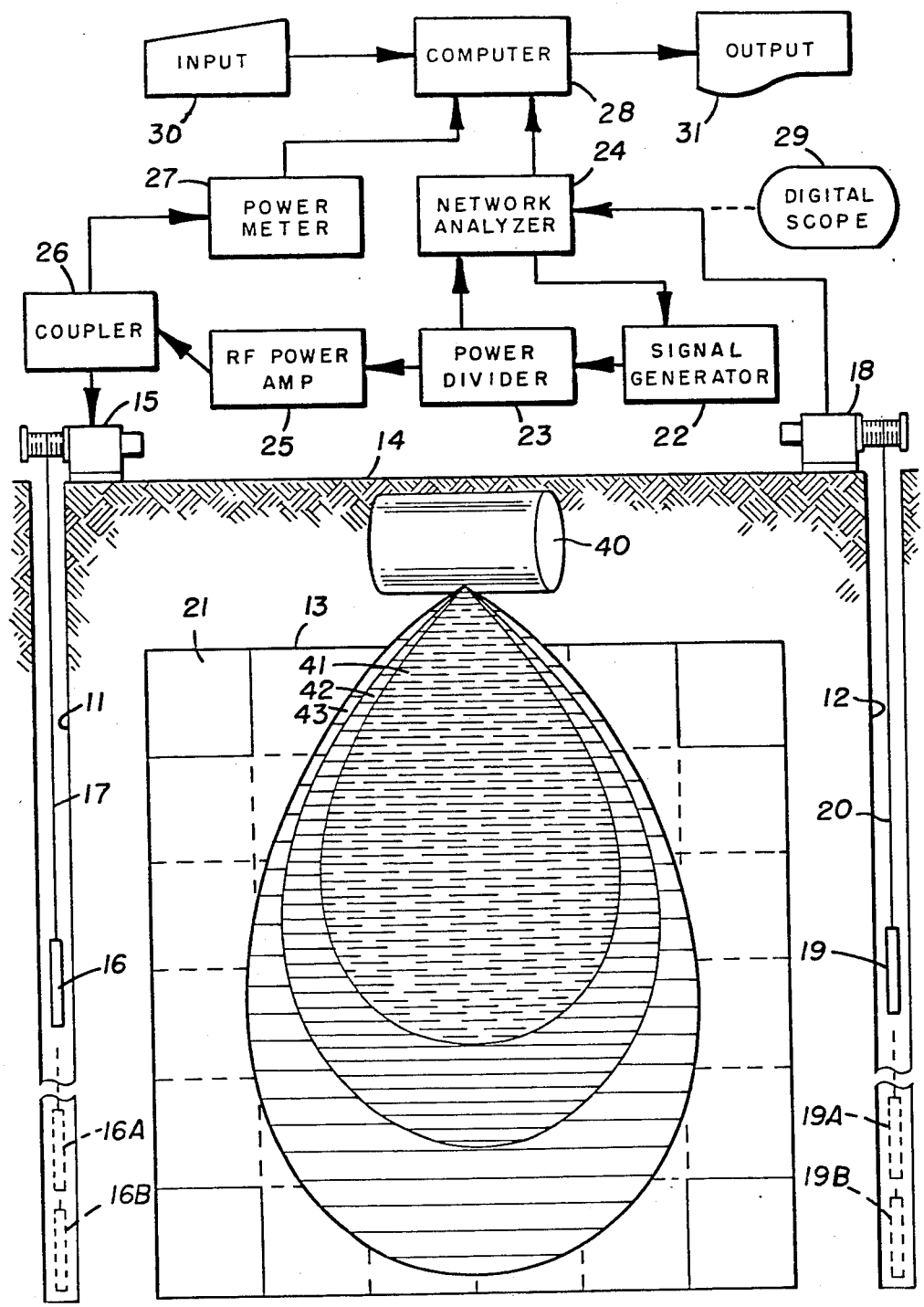
FIG. 1, one part, found in the lower half of the drawing, is a combination of two aspects of the invention in a cross-sectional view of the subsoil structure between two boreholes and is used to explain the basic principles of the invention. This shows an underground gasoline tank leaking into the space between the two boreholes. The second part found in the top half of the drawing is a schematic diagram showing the computer controlled mechanical winches for controlled raising and lowering of both the transmitter and the receiver, and also the electrical and computer components to reduce the electromagnetic radiation data to useful form.

In a report prepared for the U.S. Nuclear Regulatory Commission (NRC), entitled "Indirect Rock Mass Investigations for Optimizing Borehole Drilling Programs: Wave Diffusion Geotomography," Vol. 4, A. Q. Howard, Jr. et al. discuss several theoretical approaches to ascertain the geologic properties and internal geometry of a soil and rock mass. [See NRC Report No. NUREG/CR-3143, Vol. 4, October 1983, L under Contract No. NRC 04-78-269.] Geotomography and wave front reconstruction (holography) were considered two promising techniques for site investigation and characterization. Algorithms were presented for both ray-optic geotometry and diffusion geotomography. At one point the measurement of both wave amplitude and phase, treating the inversion using complex variables with the VECTOR algorithm in theory is discussed. However, the ability to solve the problem, or to determine whether or not the problem was capable of being solved, was limited by the unavailability of an adequate computer program.

In a Final Report entitled "High Resolution Geotechnical Exploration Using Wave-Diffusion Geotomography," by Charles E. Glass, et al., a high resolution method to remotely image rock mass features important to the construction of deep basing facilities is disclosed. [See Small Business Innovation Research (SBIR) Program Phase I, Contract No. F04704-85-C-0121, supported by: USAF Ballistic Missile Office, Norton Air Force Base, Calif., Report submitted March 1986.] The reference discloses that wave-diffusion geotomography furnishes precise images of subsurface rock mass electrical properties, properties which relate directly to the subsurface distribution of ground water.

The complex patterns of both electrical conductivity and dielectric constant can be reconstructed precisely using wave-diffusion geotomography. A number of wave-diffusion algorithms can be implemented using iterative approaches, however, conventional projection approaches are unstable and do not converge. One iterative algorithm which is useful in the present invention is the one published by V. Pan and J. Reif, entitled "Efficient Parallel Solution of Linear Systems," *Proceedings*, 17th Annual ACM Symposium on the Theory of Computing, Providence, R.I., pp. 143-152, May 1985. This reference and particularly the algorithm disclosed is hereby incorporated by reference.

A portion of the text related to the Pan Reif algorithm described in the aforementioned reference is reproduced hereinbelow:

2. Iterative Methods for Parallel Matrix Inversion

Definition 2.1. Let a vector norm be fixed. Then we extend it to the associated operator norm of matrices so that $$\|W\| = \max_{v \neq 0} \|Wv\| / \|v\| \quad (2.1)$$

for all nonzero vectors v and for all matrices W.

Hereafter $n^{O(1)}$ denotes the values bounded by a polynomial in $n$ as $n \to \infty$, $A = (a_{ij})$ is a fixed $n \times n$ nonsingular complex matrix (so $A^{-1}$ exists), I denotes the $n \times n$ identity matrix, $R(X)$ denotes $I - XA$, and B is called an *approximate inverse* of A if $$R(B) = I - BA, \|R(B)\| = q < 1. \quad (2.2)$$

(Actually (2.2) implies that A and B are nonsingular, see [Atkinson, 78], p. 465.) $\|(R(B))^i\| \leq q^i \to 0$ as $i \to \infty$ if (2.2) holds.

Lemma 2.1. Let $\|(R(B))^i\| \to 0$ as $i \to \infty$. Then $$A^{-1} = \sum_{i=0}^{\infty} (R(B))^i B.$$

Proof.

$A^{-1} = (A^{-1}B^{-1})B = (BA)^{-1}B = (I-R(B))^{-1}B = \sum_{i=0}^{\infty} (R(B))^i B.$ Lemma 2.1 immediately implies Lemma 2.2. Let $B_k^* = (\prod_{h=0}^{k-1}(I+(R(B))^{2^h}))B.$ Then $A^{-1} - B_k^* = \sum_{i=2^k}^{\infty} (R(B))^i B.$ The relations (2.2) and Lemma 2.2 imply that $$\|A^{-1} - B_k^*\| \leq \sum_{i=2^k}^{\infty} q^i \|B\| = q^{2^k} \|B\| / (1-q). \quad (2.3)$$

The first algorithm for INVERT successively computes $(R(B))^{2^h}$ and $B_h^*$ for $h=0,1,...,k-1$. Recall that, by the virtue of (2.2), $\|(R(B))^i\| \leq q^i$, so the computation by that algorithm is stable. Performing Newton's iteration $B_h = (2I - B_{h-1}A)B_{h-1} = (I+R(B_{h-1}))B_{h-1}$, $h=1,2,...$ for the matrix equation $R(X)=0$ we arrive at a self-correcting algorithm with the same convergence rate and complexity estimates as the first algorithm, (see also another alternative in [Pan and Reif, 85]).

(2.3) implies

Lemma 2.3. Let (2.2) hold and $$q = 1 - 1/n^{O(1)} \text{ as } n \to \infty. \quad (2.4)$$

Let c be a constant. Then $O(\log n)$ iterations of the algorithm of this section suffice in order to compute a matrix $\tilde{A}^{-1}$ such that $$\|A^{-1} - \tilde{A}^{-1}\| \leq 2^{-n^c} \|B\|. \quad (2.5)$$

The latter precision suffices for all practical purposes and cannot be reduced further if $|(\log \|B\|)| \leq n^{O(1)}$ and if the entries of $A^{-1}$ are to be represented by binary numbers of the form $a 2^{-k}$ where a and k are integers, $|a| < 2^m$, $0 \leq k < m$, $m = n^{O(1)}$.

Lemma 2.3 immediately implies the following

Theorem 2.1. Let (2.2) and (2.4) hold and let c be a constant. Then $O(\log^2 n)$ time and simultaneously $M(n)$ processors suffice in order to compute a matrix $\tilde{A}^{-1}$ satisfying (2.5).

Here (and frequently hereafter) we exploit the possibility to reduce the number of processors by a constant factor k by the price of slowing down the computation k times.

It remains to choose B satisfying (2.4) for a nonsingular A. Hereafter in all expressions $\Sigma_i, \Sigma_j, \max_i, \max_j, \max_{ij}$ the integer parameters i and j range from 1 to n. Let us specify the vector norm to be the Euclidean norm, $\|v\| = (\Sigma_i |v_i|^2)^{1/2}$, and let us extend that vector norm to the matrix norm by (2.1). The resulting matrix norm is called the *l-norm*. Let us choose $$B = tA^H, t = 1/(\max_i \sum_j |a_{ij}| \max_j \sum_i |a_{ij}|). \quad (2.6)$$

Here $A^H$ designates the *Hermitian transpose of a matrix* $A = (a_{ij})$. $A^H = (a_{ji}^*)$, $a_{ji}^*$ being the complex conjugate of $a_{ji}$. If A is real, then $A^H$ is the transpose of A (designated $A^T$).

$$\text{cond } A = \|A\| \cdot \|A^{-1}\| \geq \|I\| = 1 \text{ if A is} \quad (2.7)$$

nonsingular, cond A = $\infty$ otherwise.

Lemma 2.4, see [Pan and Reif, 85]. Let $A = (a_{ij})$ be nonsingular, let B be defined by (2.6) and R(B) be defined by (2.2). Then $\|B\| \leq 1/\|A\| \leq 1/\max_{ij}|a_{ij}|$, $\|R(B)\| \leq 1 - 1/((\text{cond } A)^2 n)$.

We also immediately verify the following estimate.

Lemma 2.5. Computing B by (2.6) costs only $3n^2 - 2n + 1$ arithmetic operations and $2n - 2$ comparisons that can be performed in $O(\log n)$ time using $n^2$ processors.

Combining Theorem 2.1, Lemmas 2.4 and 2.5, and the inequality of (2.7) we get

Corollary 2.1. Let $A = (a_{ij})$, $c$ be arbitrary constant, cond $A \leq n^{O(1)}$. Then $O(\log^2 n)$ time, $M(n)$ processors suffice to compute a matrix $\tilde{A}^{-1}$ such that $\|A^{-1} - \tilde{A}^{-1}\| \leq 2^{-n^c} / \|A\| \leq \|A^{-1}\| 2^{-n^c} / \text{cond } A \leq \|A^{-1}\| 2^{-n^c}$.

In the next remark and in Appendix B we will use the following definition, compare [Atkinson, 78].

Definition 2.2. $\|W\|_\infty = \max_i \sum_j |w_{ij}|$, $\|W\|_1 = \max_j \sum_i |w_{ij}|$ are the operator norms of a matrix $W = |w_{ij}|$ associated with the maximum norm $\|v\|_\infty = \max_i |v_i|$ and with the 1-norm $\|v\|_1 = \sum_i |v_i|$ of a vector $v = (v_i)$, respectively, compare (2.1). If $W$ is nonsingular, (cond $W)_s = \|W\|_s \|W^{-1}\|_s$ for $s = \infty, s=1$.

Remark 2.1. Using Definition 2.2 we may rewrite (2.6) as $$B = tA^H, t = 1/\|A^H A\|_1$$

and deduce that, for this choice of B, $$\|R(B)\| \leq 1 - 1/(\|A^H A\|_1 \|A^{-1}\|^2), \quad (2.8)$$

which is a small improvement over Lemma 2.4 that leads to the respective improvement of Corollary 2.2.

Remark 2.2. Lemma 2.4 can be proven for any (nonsingular) matrix A. For certain classes of matrices A there exist other options for choosing an approximate inverse B. In Appendix B we indicate such options for some important classes of matrices including Hermitian (real symmetric) positive definite, diagonally dominant and triangular matrices.

3. Proof of Lemma 2.4.

Definition 3.1. $\rho(W)$, the spectral radius of a matrix $W$, is the maximum magnitude of the eigenvalues of $W$.

Definition 3.2. A matrix that can be represented as $W^H W$ for some matrix $W$ is called a *Hermitian positive semidefinite matrix* (or a *Hermitian nonnegative definite matrix*). A nonsingular Hermitian positive semidefinite matrix is called *Hermitian positive definite*. A real Hermitian positive definite matrix is called *symmetric positive definite*. ($W^H W$ is Hermitian since $(W^H W)^H = W^H (W^H)^H = W^H W$, compare Definition 2.2.)

We will use the 3 following well known results, see [Atkinson, 78], pp. 416–431, or [Wilkinson, 65]. (Recall that $\|W\|$ denotes the 2-norm of a matrix $W$.)

Lemma 3.1. $\|W\| = \|W^H\|$ for all $W$; $\|W\| = \rho(W)$ if $W = W^H$.

Lemma 3.2. All eigenvalues of a Hermitian positive semidefinite matrix are nonnegative.

Lemma 3.3. Let $W = (w_{ij})$. Then $\|W^H W\| = \rho(W^H W) = \|W\|^2 \leq \|W^H W\|_1 \leq \max_i \sum_j |w_{ij}| \max_j \sum_i |w_{ij}| \leq n \|W^H W\|$.

Applying Lemma 3.3 to $W = A^H$ we obtain that $\|A^H\|^2 \leq 1/t$ where $t$ is defined by (2.6). Therefore, by Lemma 3.1, $\|A^H\| \leq 1/(t\|A\|)$. Now the first 2 inequalities of Lemma 3.4 below since $\|A\| \geq \max_{i,j} |a_{ij}|$.

Corollary 3.1. Let $A = (a_{ij})$, $B$ be defined by (2.6). Then $\|B\| \leq 1/\|A\| \leq 1/\max_{i,j} |a_{ij}|$.

It remains to prove the last inequality of Lemma 2.4.

Lemma 3.4. Let $\lambda$ be an eigenvalue of a nonsingular matrix $W$. Then $1/\lambda$ is an eigenvalue of $W^{-1}$.

Proof. Surely $\lambda \neq 0$ for nonsingular $W$. Let $Wv = \lambda v$ for a vector $v \neq 0$. Then $Wv \neq 0$ and $W^{-1}(Wv) = v = (1/\lambda)\lambda v = (1/\lambda)Wv$. Q.E.D.

Corollary 3.2. Let $\lambda$ be an eigenvalue of $A^H A$ and $A$ be nonsingular. Then $1/\|A^{-1}\|^2 \leq \lambda \leq \|A\|^2$.

Proof. $\lambda \leq \rho(A^H A) = \|A\|^2$ by Definition 3.1 and Lemma 3.3. On the other hand, $(A^H A)^{-1} = A^{-1}(A^{-1})^H$, so $(A^H A)^{-1}$ is a Hermitian positive definite matrix. By the virtue of Lemma 3.4, $1/\lambda$ is an eigenvalue of $(A^H A)^{-1}$. Consequently $1/\lambda \leq \rho((A^H A)^{-1}) = \rho(A^{-1}(A^{-1})^H) = \|A^{-1}\|^2$. Q.E.D.

Lemma 3.5. Let $B$ and $t$ be defined by (2.6). Let $\mu$ be an eigenvalue of $R(B) = I - BA$. Then $0 \leq \mu \leq 1 - 1/((\text{cond } A)^2 n)$.

Proof. Let $R(B)v = \mu v$ for $v \neq 0$. Then $(I - tA^H A)v = v - tA^H Av = \mu v$. Therefore $A^H Av = \lambda v$ for $\lambda = (1-\mu)/t$ so $\lambda$ is an eigenvalue of $A^H A$. Corollary 3.2 implies that $1/\|A^{-1}\|^2 \leq \lambda = (1-\mu)/t \leq \|A\|^2$. It immediately follows that $$1 - t\|A\|^2 \leq \mu \leq 1 - t/\|A^{-1}\|^2. \quad (3.1)$$

It remains to recall (2.6) and to apply Lemma 3.3. Q.E.D.

Since $\mu$ is an arbitrary eigenvalue of $R(B)$, $\rho(R(B)) \leq 1 - 1/((\text{cond } A)^2 n)$. On the other hand, $\|R(B)\| = \rho(R(B))$ since $R(B) = I - tA^H A$ is Hermitian. This completes the proof of Lemma 2.4. Q.E.D.

With reference to the lower portion of FIG. 1 as described above, the lower portion shows a cross-sectional view of two spaced apart boreholes 11 and 12 having a vertical plane 13 between them. Land surface 14, is between boreholes 11 and 12 is over plane 13, and is the surface on which rests the computer controlled winch 15 for electromagnetic radiation transmitter 16 on cable 17 and for computer controlled winch 18 for electromagnetic radiaton receiver 19 on cable 20.

Multiple electromagnetic radiation transmitters and receivers at different locations have been demonstrated by computer in the present invention to produce the desired conductivity and dielectric constant values. The invention contemplates the use of multiple transmitters 16, 16A, 16B, etc. and multiple receivers 19, 19A, 19B, etc., normally with the number of transmitters 16 being less than the number of receivers 19. Here, multiple transmitters and multiple receivers also means multiple transmitter and multiple receiver locations.

The boreholes 11 and 12 are shown being essentially parallel. However, accurate data are also obtained if the boreholes are skewed, angled, helical and the like, so long as the distance between transmitter 16 and receiver 19 are accurately known. It is to be understood that electromagnetic radiation (or radiation) in this invention include, radiation having wavelengths from about 100 meters to 0.1 meter, and also includes seismic radiation wavelengths in the same range. A preferred range for the wavelength is between about 10 meters and 1 meter. It is noted that for the purpose of this invention that "electromagnetic radiation" or "radiation" also includes wavelengths in the seismic and sonic ranges.

VECTOR-Geotomography Design Requirements—Using Volume Eddy Current Technique of Reconstruction (VECTOR)-geotomography, all transmitters (16, 16A, 16B, etc.) send a signal simultaneously and in phase so that increases in unique receiver data must be acquired by increasing the number of receivers (19, 19A, 19B, etc.) in the receiver borehole 12. The unique information that can be acquired depends upon the probing frequency being used. For probing frequencies of 100 MHz (wavelengths on the order of 1 m for our models) very little new information can be acquired by increasing the receiver density beyond approximately four or five receivers per meter. A preferred number of receivers is about twice the number of patches. Length of receiver borehole 12 and signal attenuation will combine to limit the number of patches 21 possible using the VECTOR algorithm. A maximum depth for the boreholes is less than about 7 miles. A more preferred depth is less than about 5 miles. An especially preferred depth is about 3 km or less. For example, a $100 \times 100$ patch network will require 20,000 receivers for a redundancy factor (ratio of receivers to patches) of only 2. At a probing frequency of 100 MHz, sampling five times per wavelength requires 4 km of borehole and the ability to measure the scattered field along the entire 4 km. Receiver density can be increased, but even if one could measure every 10 mm along the borehole, 100 m of borehole would be required. It is doubtful that measurements at 10 mm intervals will provide crisp new data even with a probing frequency of 1 GHz. Hence, a rule of thumb for the maximum number of patches for a given VECTOR-geotomography field situation is:

$$NP \simeq \frac{5(BL)}{2\lambda}$$

where NP is the number of patches in the reconstruction, BL is the length of receiver borehole in which effective measurements can be made, and $\lambda$ is the probing wavelength. A borehole 200 meters deep would permit a VECTOR-geotomography reconstruction of approximately 500 patches ($22 \times 22$) at 100 MHz. For boreholes 100 m apart, one could achieve resolutions of between 2 to 5 m depending upon placement of the reconstruction grid.

Transmitter borehole 11 is designed to the same requirements as a linear antenna array, because in the VECTOR-geotomography algorithm all transmitters must effectively work simultaneously. This arises, as discussed below, because the x vector reconstructed in the VECTOR algorithm is not invariant with respect to transmitters; it contains the dependence on $\phi 2$ (see below). Consequently, the number of transmitters 16 (16A, etc) and their spatial placement in transmitter borehole 11 determine the width of the effective antenna beam. Signal strength must be great enough to permit the scattered field to irradiate the measurement borehole. Signal power on the order of 100 W should be adequate for most field situations. This is quite a modest requirement considering the systems available today which are capable of generating several KW of power. Best coverage will be obtained when receivers and transmitters are aligned symmetrically with respect to the reconstruction region, but this is not a strict requirement. Receivers must, however, be capable of measuring both signal amplitude and phase.

TENSOR-Geotomograhy Design Requirements—The added iterations required during reconstruction using the TENSOR algorithm are partially offset by advantages in field design. Unlike VECTOR-geotomography, Transmitter-Enhanced Numerical Solution of Reconstruction (TENSOR)-geotomography permits each transmitter 16, or array of transmitters (16, 16A, 16B, etc.) to operate individually much as the typical ray-optic approach does. Hence, under the same conditions as specified above for VECTOR-geotomography, instead of 20,000 receivers (19, 19A, 19B, etc.), TENSOR-geotomography can achieve equal redundancy of 2 using only 150 of both transmitters and receivers. For the same 200 m borehole and frequency of 100 MHz, TENSOR-geotomography needs only 30 m of receiver borehole 12 rather than 4 km. Resolution of TENSOR-geotomography is then less dependent on borehole geometry. Transmitter 16 and receiver 19 design, transmitter power requirements, and receiver measurements are essentially the same as for VECTOR-geotomography.

In the upper portion of FIG. 1 is a schematic electrical diagram describing computer controlled winches 15 and 18 to raise and lower transmitters 16, 16A, etc., and receivers 19, 19A, etc., respectively. In the schematic a signal generator 22 producing the electromagnetic radiation is connected to a power divider 23. In power divider 23, a portion of the signal is conveyed to the network analyzer 24 as a measure of the transmitted electromagnetic radiation. There are also commercial instruments available which incorporate the functions of signal generator 22, power divider 23 and network analyzer 24, and are purchased as network analyzers. The signal then passes through the RF power amplifier 25 and then to the coupler 26. A small portion of the signal is shunted through power meter 27 for storage in computer 28.

The electromagnetic radiation reaches the transmitters 16, 16A via cable 17. Cable 17 is protected by ferrite beads to minimize uphole conduction of transmitter radiation. The electromagnetic radiation signal may be pulsed or continuous and is transmitted from one or more of the transmitters 16, 16A, etc. and is received by one or more receivers 19, 19A, etc. The signal is visually monitored for at least the amplitude and phase of the wave on optional digital scope 29, or visually monitored on the screen of computer 28, and measured in network analyzer 24 for both amplitude and phase. Network analyzer 24 is connected to the signal generator 22 wherein the signal is divided in power divider 29 and also the network analyzer 27. Computer 28 has an input 30 on which data can be manually entered into the computer. The output 31 of the data processing is expected to be the series of values for dielectric constant and conductivity such as are found in the 36 patches as shown in FIG. 2.

Background information regarding the base (background) condition of the soil may be obtained in a number of ways. One method is analyzing samples of the core of the borehole as each is being drilled. Another is to have a third borehole at the edge of the area to be monitored between the active boreholes. The background information (e.g. conductivity, dielectric constant, etc.) is a standard to which is compared the unknown information derived in the present invention.

In a preferred embodiment the following equipment is used to generate the amplitude and phase data regarding the transmitted and received electromagnetic radiation.

| Motorized Antenna Cable Reel 15 and Reel 18 | Standard Reel |
|---|---|
| Transmitter(s) 16, 16A, etc.: | Dipole Antenna Length: ½ wavelength L = c/2 fn, where n = √ε L = 5 n @ 10 MHz and n = 3 |
| Cable 17 and Cable 20: | 100 meters Coaxial Cable Vector Cable Co., 20 db at 10 MHz |
| Receiver(s) 19, 19A, etc.: | Encapsulated Receiver Active wide-band Preamp plus monopole antenna (5 cm × 50 cm) |
| RF Power Amplifier 25: | Amplifier Research Model 1000 LA 1000 watt, 10 KHz to 300 MHz |
| Directional Coupler 26: | Mini Circuits, Inc. |
| Power Meter 27: | Hewlett-Packard Model 436A Power Meter |
| Computer 28: | IBM-PC Compatible Portable Computer |
| Digital Scope 29: | Tektronix 2430 Digital Scope 150 MHz |
| Network Analyzer 24: | Hewlett-Packard Model 8753A 300 KHz to 3,000 MHz |
| Signal Generator 22: (optional) | Hewlett-Packard Model 8656B 100 KHz to 990 MHz |
| Power Divider 23: (optional) | |

Also in FIG. 1 in the lower portion is shown a 6×6 patch grid plane 13 having square patches 21 each having a 2-meter side. The surface area has a gasoline tank 40 which is suspected to be leaking into the subsoil. This grid plane is interrogated using the system described hereinabove at about 300 MHz. The output from the data processing using the computer program is expected to generate the values for dielectric constant and conductivity for each of the patches (1-36) shown in FIG. 2. Using this generated information, the concentration of gasoline and water in each patch plane can be reconstructed. The plume areas 41, 42 and 43 are then easily created using a graphics computer program. Area 41 is expected to have the largest concentration of gasoline with the available soil porosity (35%) being filled with about 95% gasoline/2% water. Area 42 is expected to have about 50% gasoline/40% water mix. Area 43 is expected to have about 25% gasoline/32% water mix. The remaining patches including patch 21, are found to have the measured background wherein the porosity of the soil has about a 24% water content and no gasoline.

In this example, either the dielectric constant or the conductivity can be used to derive the gasoline/water mix. In more complex soil environments, both dielectric constant and conductivity used together will prove very useful to discern soil structure and enable reconstruction of contaminant distributions. The movement of the gasoline plume areas 41, 42 and 43 from underground storage tank 40 into the subsoil can be easily monitored over time using this method. Similarly, any type of underground tank containing organic or inorganic chemicals (i.e., contaminants from any impoundment) can be monitored for leaking and extent of contamination by adaptation of this method (i.e., plume monitoring a one-time or multiple monitoring over a period of time).

Figure 3:
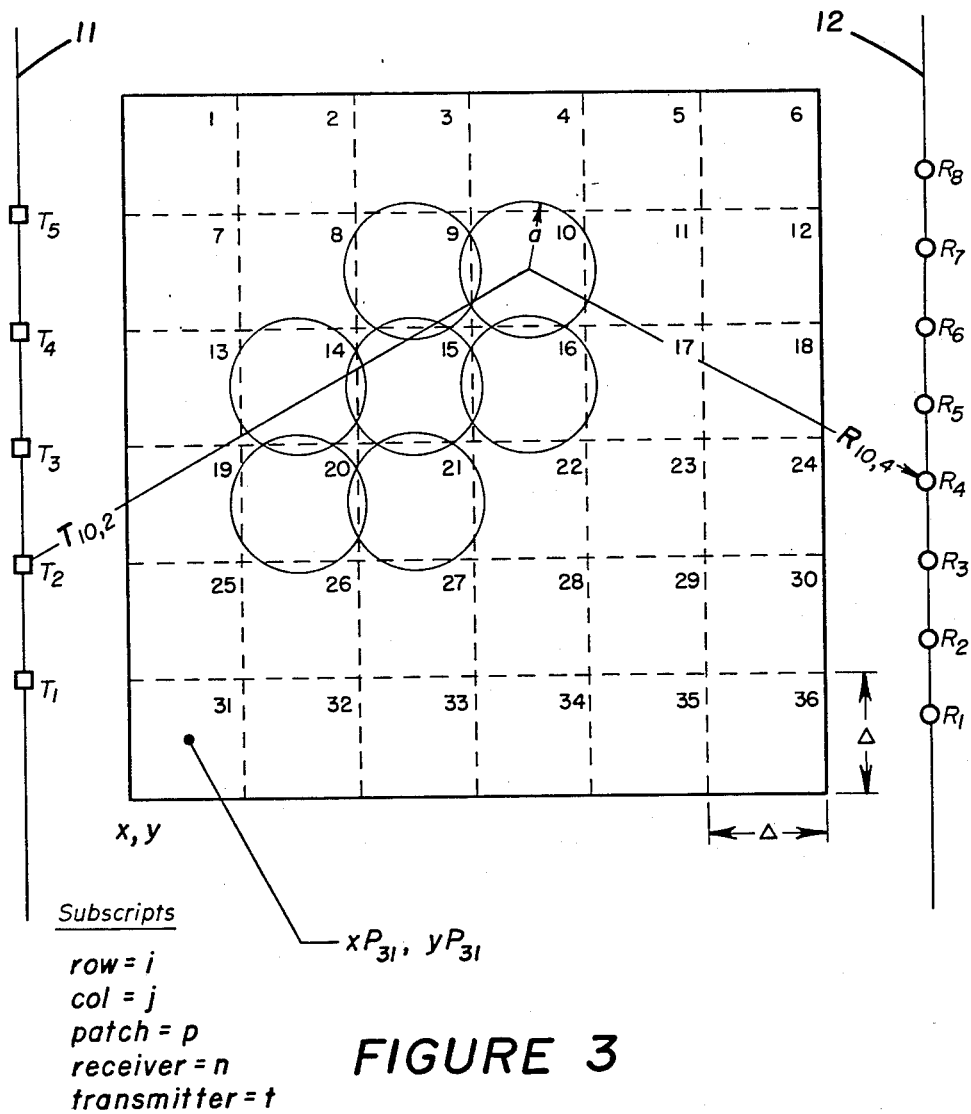
FIG. 3 is a diagram of the scanned area shown in FIG. 2 illustrating at least some of the dimensional relations used in reducing the measured data.

VECTOR-Geotomography Solution-The solution to the VECTOR-geotomography problem requires the assistance of computer technology principally because of the size of the matrices necessary to obtain the solution. In order to better understand the flow charts included herein as FIGS. 4-6, the diagram FIG. 3 should first be discussed. In FIG. 3 an array of transmitters T1 through T5 (transmitters 16A, 16B, etc. in FIG. 1) is located in bore hole 11 while a corresponding line of receivers R1 through R8 (receivers 19A, 19B, etc. in FIG. 1) is located in a second borehole 12. Between these two bore holes is the area to be scanned. This area may well be the area located under the gasoline storage tank 40 as illustrated in FIG. 1.

It is appropriate to divide the scanned area into patches. In a gross sense, a patch, when represented on a cathode ray tube or other display device, can be compared to a pixel. For convenience sake, the patches hereinafter are numbered in rows starting with the top row (See FIG. 3). The dimension of each patch will be referred to as $\Delta$ making a square patch of area $\Delta^2$. In the mathematics necessary for the solution of the problem, it is appropriate to convert the square patches into an equivalent circle. The equivalent circle has a radius a equal to $0.564\Delta$. The distance from the center of each patch XP, YP to the receiver will be referred to with the uppercase R and the subscript of the patch number and the receiver number. Similarly, the distance from an appropriate transmitter to a patch number will be referred to as uppercase T with the subscript of the patch number followed by the subscript of the transmitter number. In referring to the patch numbers in the matrix algebra that follows, the conventional Row i, Column j convention will be used. A particular patch may also be referred to as an uppercase P with the patch number being a subscripted lowercase p. The subscript denoting each receiver will be lowercase n and the subscript denoting the particular transmitter will be a lower case t. The center of each patch will be referred to by its conventional cartesian coordinates as $XP_p$, $YP_p$. The geometrical location of each patch will be referred to by its coordinates, with the lower left hand corner of the patch pattern being referred to as $X_1$, $Y_1$. Other subscripts and the like will be readily recognized from a study of the flow charts appended hereto.

Figure 4A:
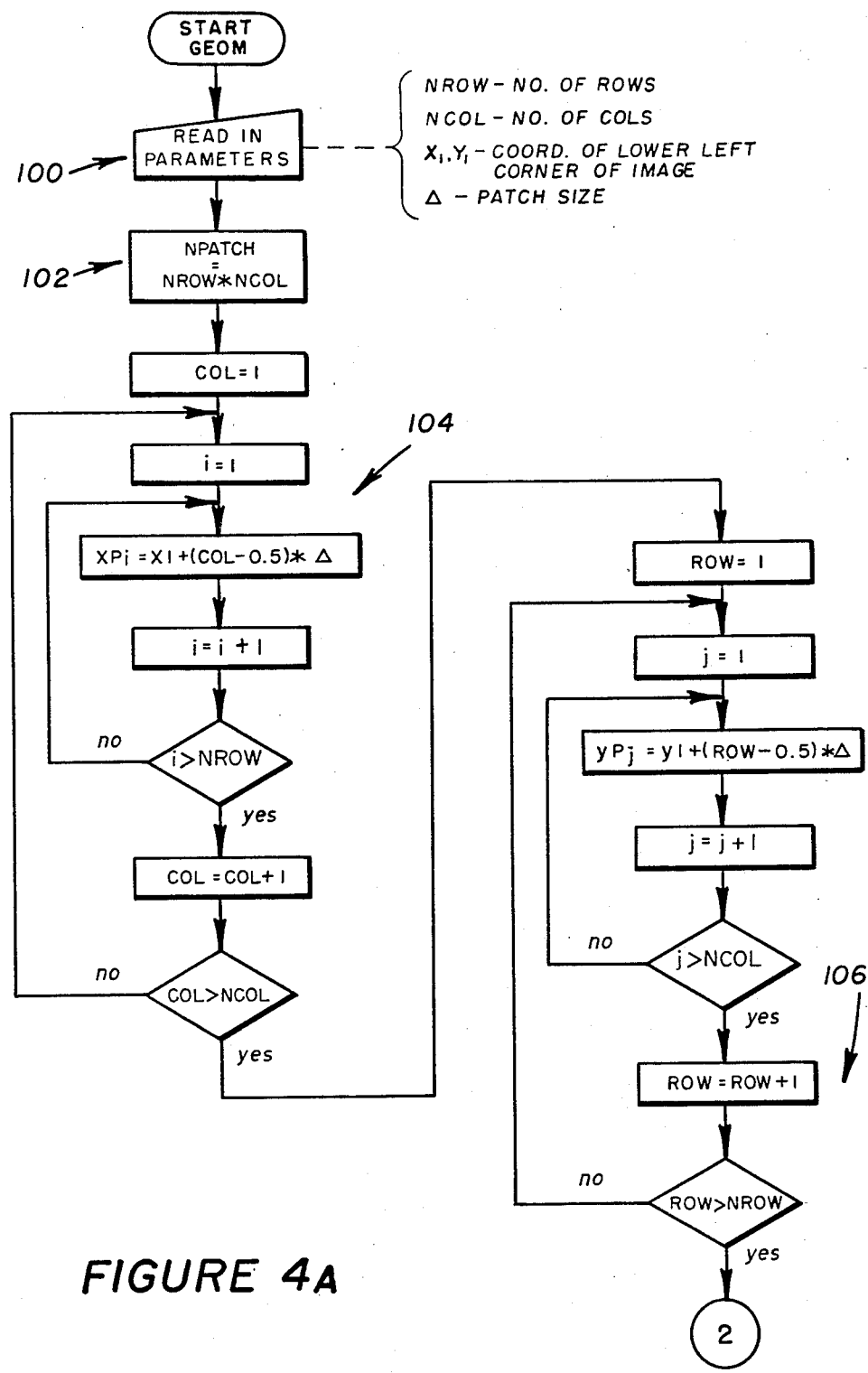
FIGS. 4A–4B is a flow chart of a representative system adaptable to a computer for determining the geometry of the scanned area.
Figure 4B:
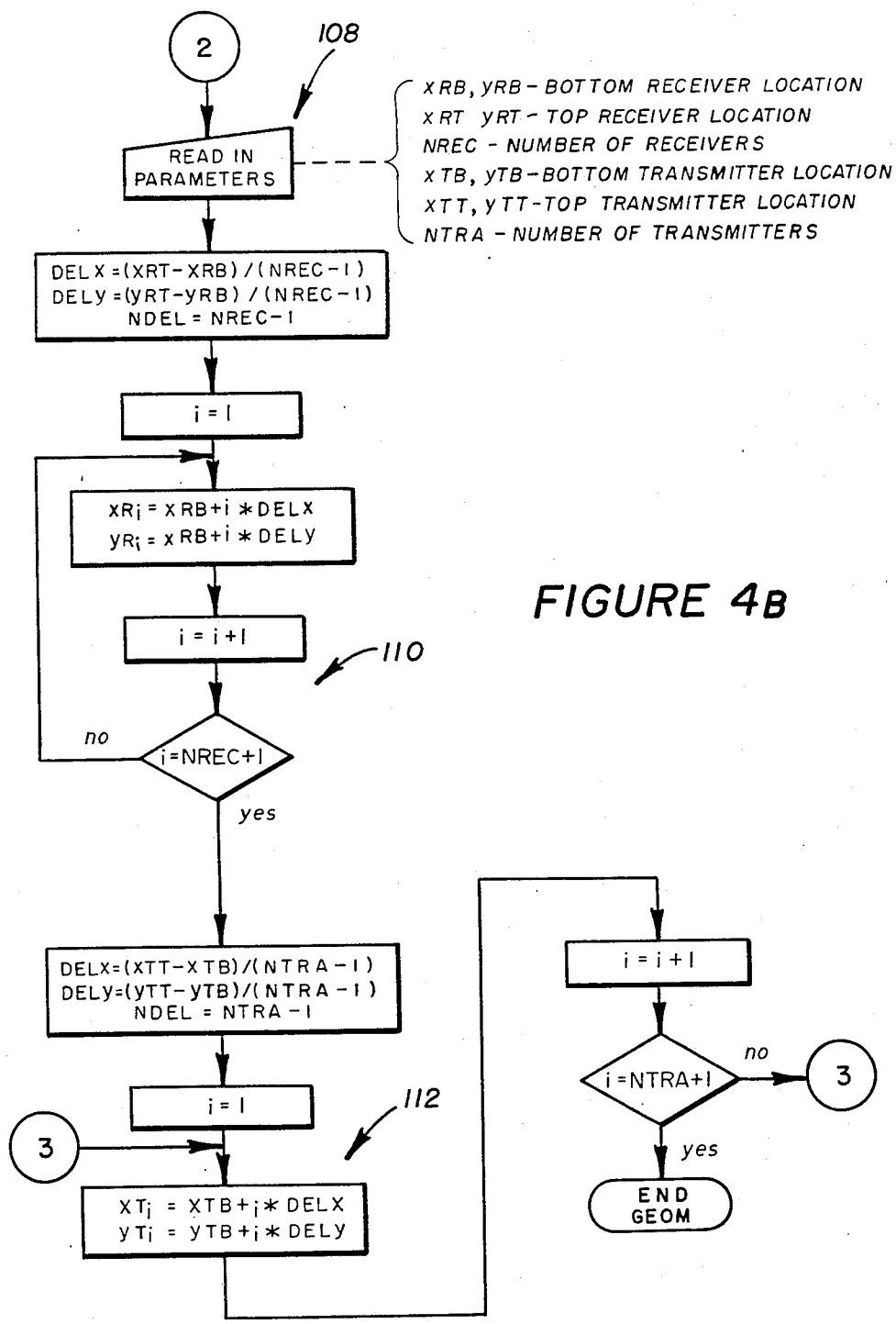

Referring to FIG. 4A and 4B, the patch geometry and transmitter information is computed. It is necessary to establish parameters which is done in step 100 shown in FIG. 4A. Specifically, the number of rows NROW and number of columns NCOL in the patch geometry along with the lower left hand corner of the image and the individual patch sizes should be entered. From this the calculation done in step 102 is to determine the patch size. In FIG. 3, it is readily apparent that this would result in 36 being the patch size in the sample. Next a loop 104 performs the necessary steps to locate the XP component of the center of each individual patch. This is followed by a similar loop 106 that computes the YP component of the center of each patch. At this point the receiver and transmitter locations are entered at step 108 so that the positioning in the various bore holes can be computed in the loops 110 and 112.

Having this information the dimensons $R_{pn}$, $T_{pt}$ can be computed. Of course the physical location $X_1$, $Y_1$ must also be known in relation to the two bore holes 11 and 12. Since computation of $R_{pn}$ and $T_{pn}$ is a relaively straightforward geometric problem, the flow chart does not include a method to calculate these figures.

Figure 5A:
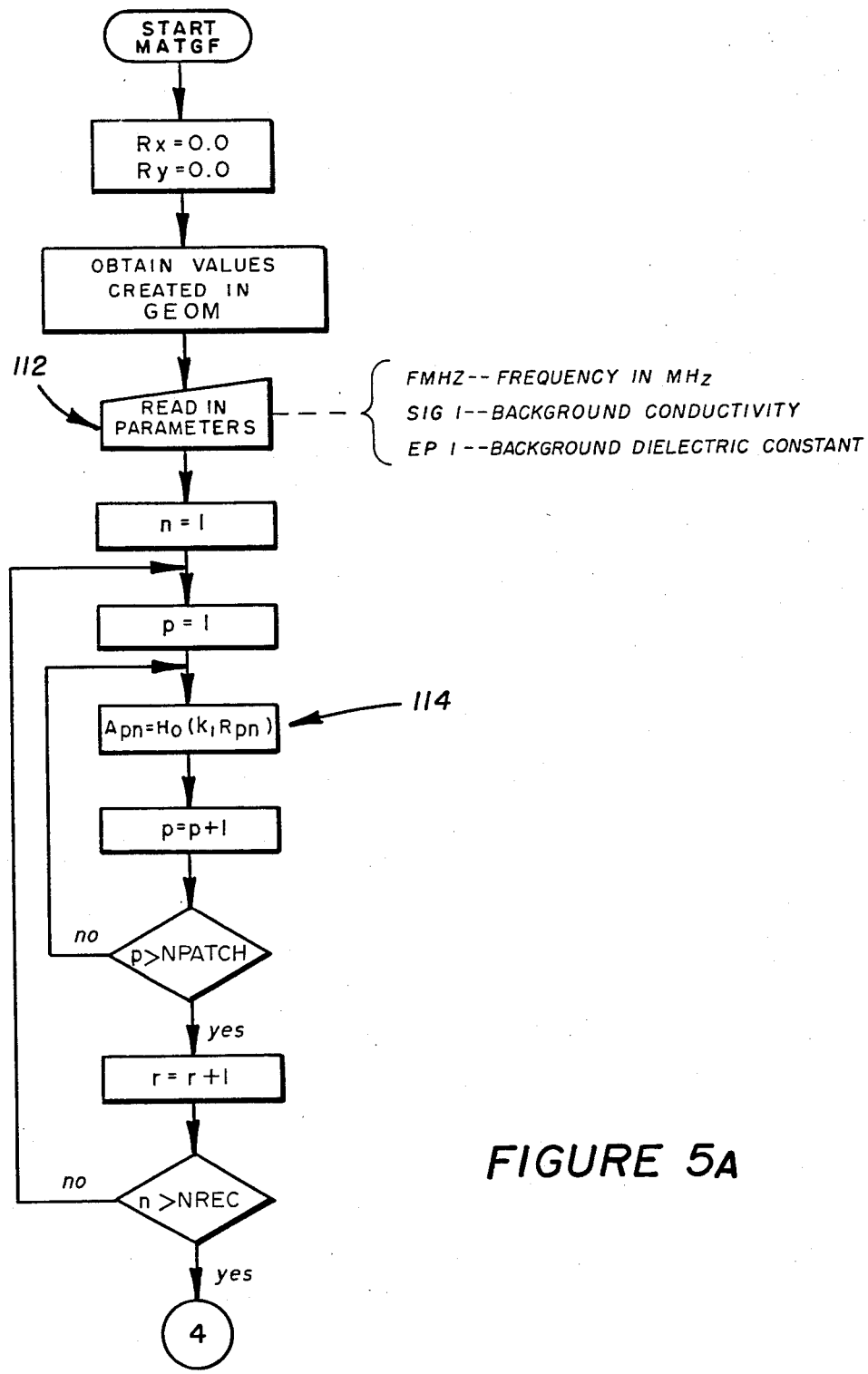
FIGS. 5A–5B is a flow chart of a representative system adaptable to a computer for calculating the basic matrices necessary for solution using among other inputs the background information.
Figure 5B:
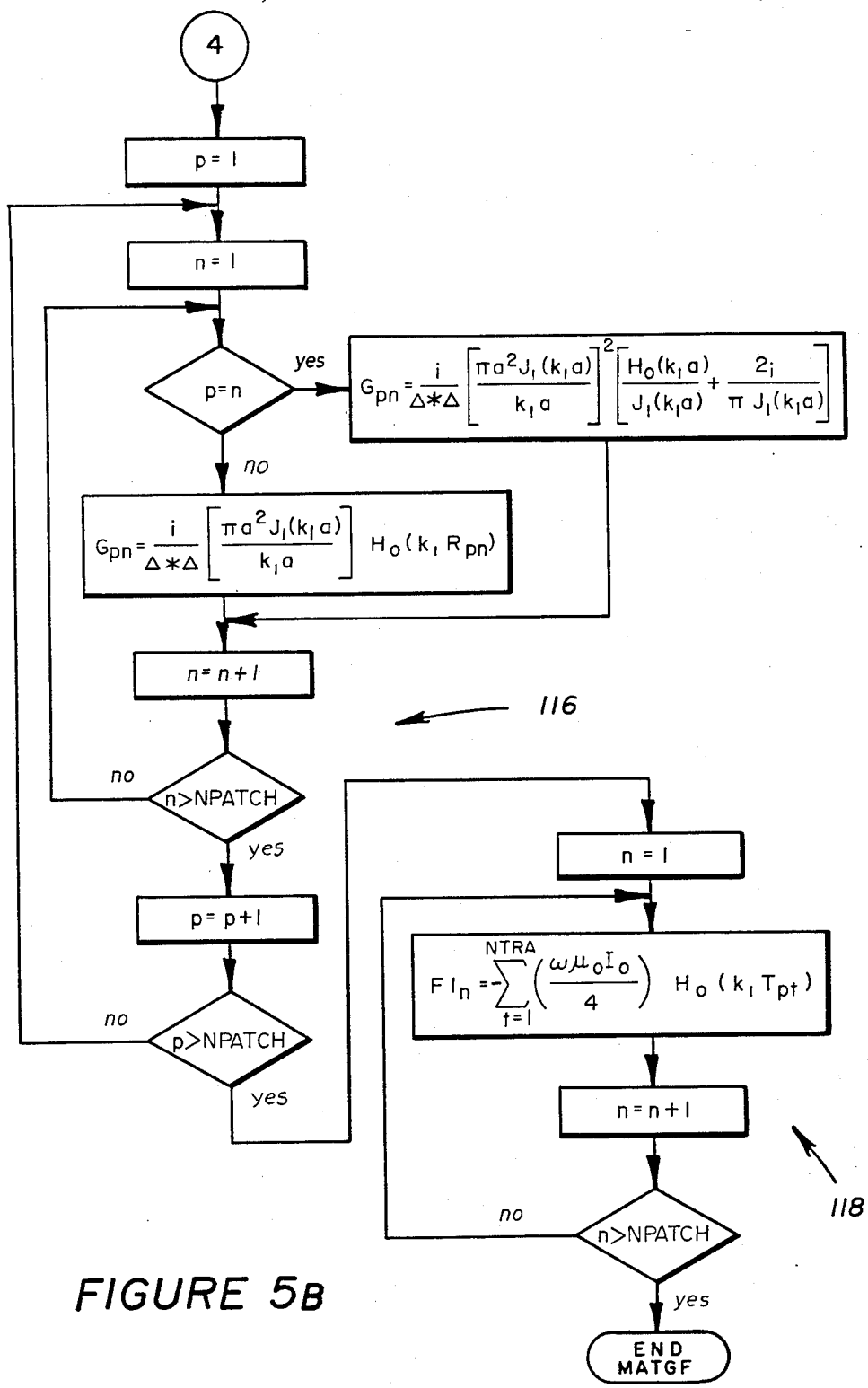

FIGS. 5A and 5B computes basic matrix functions necessary for solution. It is to be understood that the parameters computed in the geometry program just described are carried through into this particular step and the subsequent step. In addition at step 112, the frequency to be utilized is read in MHz along with the background conductivity and background dielectric constant. These two figures can be determined experimentally from the adjacent soil. One possible solution, previously noted, is to take core samples during the drilling of the bore hole to determine the conductivity and the dielectric constant of the soil in the vicinity of the area to be sampled. It should be remembered that one of the uses of this particular method is to determine the conductivity and dielectric constant between two spatially separated boreholes. In particular, the method is useful where it is not practical to drill a borehole (e.g., under or through a contaminant). At step 114 the Hankel function of the first kind of order 0 with a complex argument is represented as $H_0$. This function $H_0(k_1 R_{pn})$ is computed for each patch to each receiver. In block 114, $H_0$ is the Hankel function of the first kind of order 0 with a complex argument while $k_1$ is a complex background wave number and $R_{pn}$ is the patch to receiver distance.

Once this $A_{pn}$ matrix is computed the patch interaction matrix G is calculated. This is accomplished in the loop 116. In general, the calculations in loop 116 calculate the interaction between the patches. For clarification sake, the Hankel function appears again in this loop along with the Bessel function which is denoted in equations as $J_1$. This Bessel function is of the first kind with a complex argument where $k_1$ is complex in both the Bessel and Hankel equations. Argument a, as noted above, is equal to the equivalent patch circle, i.e., 0.546Δ. Because the arguments are necessarily complex, this technique to determine useful information is called complex geotomography.

Upon completion of the computation of the interaction matrix G, the incident field must be computed at each patch F1. This is accomplished in loop 118 again using the Hankel function $H_0$. In this case the distance is from the transmitter $T_t$ to the patch $P_p$ and is represented by the term $T_{pt}$.

Figure 6A:
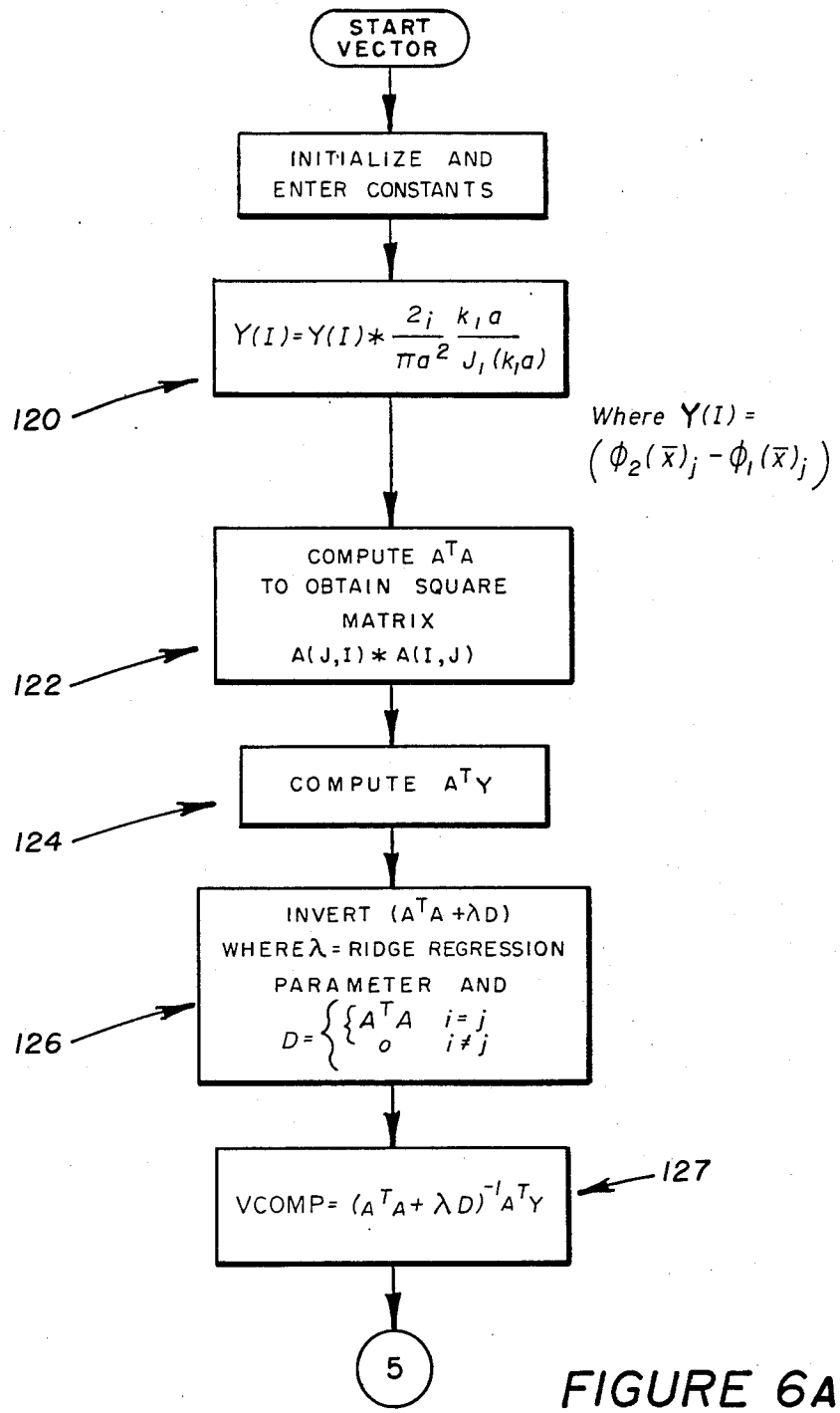
FIGS. 6A–6B is a flow chart of the solution using the measured frequency and phase.
Figure 6B:
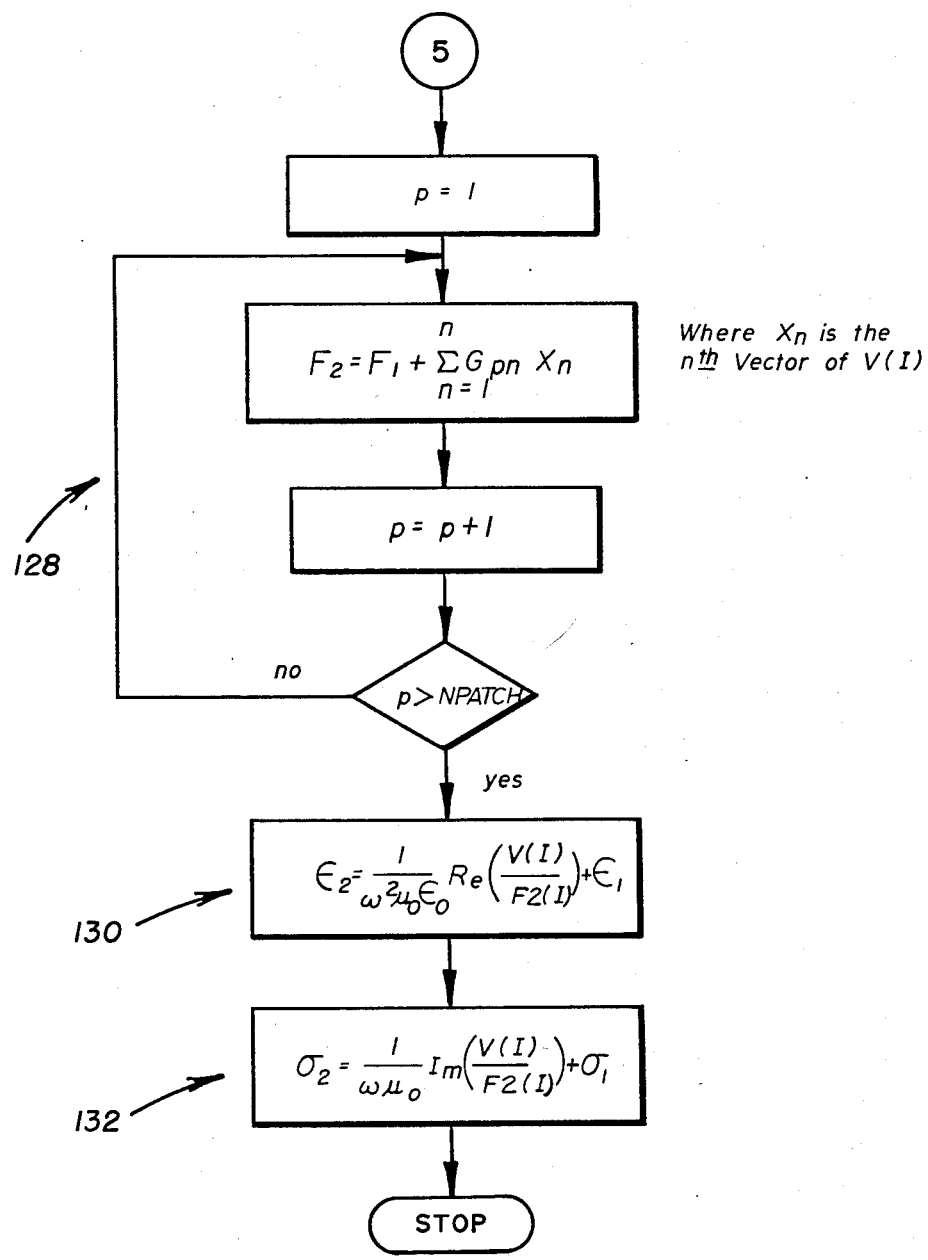

At this point, the program titled VECTOR, and illustrated in the flow charts in FIGS. 6A–6B may be used to solve the conductivity and dielectric constant problems necessary to arrive at the composition of the various patches. Certain constants should be entered either at this time or obtained from the earlier programs illustrated in FIGS. 4A–4B and 5A–5B. Specifically, the previously mentioned equivalent patch circle, $\omega$, $\mu_0$, $\epsilon_0$ which is equal to $8.85 \times 10^{-12}$, and $k_1$ which is equal to $$DCSQRT\left\{ (\omega^2 |\mu_0|) \left( \epsilon_0 \epsilon_1 + \frac{i\sigma}{\omega} \right) \right\}$$

The transmitted and received fields are also entered at this point wherein $\Phi_1(x_j)$ is the transmitted field and $\Phi_2(x_j)$ is the received field. This is represented by Y(I) as indicated in FIG. 6A at 120. The vector Y(I) is modified by the factors shown in the right hand side of the equation shown in block 120.

Next the Hankel function matrix A, computed in the previous step, is converted to a square matrix as indicated in step 122 and this square matrix is combined with the modified Y vector that results from the operation in 120 at step 124. To this point, the computation followed well established lines. However, in operation block 126, the Pan-Reif algorithm for inversion of this rather large matrix is utilized. The Pan-Reif inversion process is noted above. The resulting matrix is multiplied with the vector $A^T Y$ to form a vector V(I) which is utilized in the step 128 to compute the total field for each patch Pp. It should be noted that the variable $X_n$ is the nth vector from the V(I) VCOMP vector computed at step 127.

At this point, sufficient information has been obtained to compute in box 130, the dielectric constant $\epsilon_2$ and the conductivity, in box 132, represented by $\sigma_2$.

Having computed the conductivity and the dielectric constant for each patch, the characteristics of that patch can be accurately described as indicated above.

VECTOR-GEOTOMOGRAPHY—VECTOR-geotomography is formulated from the integral equation describing the received electromagnetic (EM) field given as $$\phi_2(\overline{x}) = \phi_1(\overline{x}) + A \int g(\overline{x},\overline{x}') \, i\omega\mu_0 j_\nu(\overline{x}') d^2\overline{x}' \tag{1}$$

where $\phi_1(\overline{x})$ is the transmitted EM field, $g(\overline{x},\overline{x}')$ is the two-dimensional Green's function corresponding to the point source equation, and $j_\nu(x')$ is the volume current source within the anomalous region given by $$j_\nu(\overline{x}') = [k_2^2(\overline{x}') - k_1^2(\overline{x}')]\phi_2(\overline{x}') \tag{2}$$

Here $k(\overline{x}')$ corresponds to the wavenumber and the integral is carried out over the anomalous area A. The idea is to solve Equatin (1) for the anomalous wavenumber and subsequently acquire the dielectric constant $\epsilon_r(x')$ and conductivity $\sigma(x')$ from $k_2$ of Equation (2).

Equation (1) can be solved by discretizing the interborehole interrogation area into a series of M square patches having dimension Δ and center of mass $\xi_m$. By defining a characteristic function $\rho_m(x)$ as $$\rho_m(\overline{x}) = \begin{cases} 1; & \text{if } \overline{x} \in R_m \\ 0; & \text{otherwise} \end{cases}$$

and assuming that the anomalous wavenumber $k_2$ and field $\phi_2(\overline{x})$ are constant within each patch, Equation (1) becomes $$\phi_2(\overline{x}) = \phi_1(\overline{x}) + \sum_{m=1}^{|M|} (k_{2m}^2 - k_1^2) \, \phi_2(\xi_m) \left| \int_A g(\overline{x},\overline{x}') \rho_m(\overline{x}) d^2\overline{x} \right| \tag{3}$$

If the square patches are approximated by circles having a radius a, such that the circle area equals $\Delta^2$ (a=0.564Δ), the integral in equation (3) can be solved analytically and equation (3) becomes $$\phi_2(x) = \phi_1(x) + \sum_{m=1}^{|M|} (k_{2m}^2 - k_1^2) \, \phi_2(\xi_m) \frac{i\pi a^2}{2} \frac{J_1(k_1 a) H_0^1(R_m k_1)}{k_1 a} \tag{4}$$

where $R_m$ is the distance from patch m to the point $\overline{x}$. In the borehole, where the field is measured, $\overline{x} = (X, y_i) = x_j$ and we have, after rearranging, $$[\phi_2(x_j) - \phi_1(x_j)] \frac{2i}{\pi a^2} \frac{k_1 a}{J_1(k_1 a)} = \sum_{M=1}^{M} (k_{2m}^2 - \quad (5)$$

$$k_1^2)|\phi_2(\xi_m)| H_0^1(R_{jm}k_1)$$

By setting the left-hand side of equation (5) (a function of borehole position j only) to Y, the $H_0(R_{jm}k_1)$ term to $A_{jm}$, and the remaining term (containing the unknown wavenumber $k_{2m}$) to $X_m$, we have the equation $$\sum_{m=1}^{M} A_{jm} X_m = Y_j$$

which is identical in form to the ray-optic approach. As in ray-optic geotomography, we wish to insure that the system is overdetermined, i.e., that the set of N measurements (j=1, 2, 3, ... N) is such that N>M. An interpretation of $X_m$ for low frequencies is that $X_m \sim i\omega\mu J_a(\xi_m)$ where $J_a(\xi_m)$ is an anomalous eddy current in patch $\xi_m$. Hence, the inverse problem physically becomes one of determining the set of eddy currents $$|X_m|_{m=1}^{M}$$

given the set of measurements $$Y_j|_{j=1}^{N}.$$

Physically this is far more satisfying than ray-optic geotomography because reflection, refraction, and wave diffusion (or diffraction, depending upon frequency) are accommodated. In addition, from the reconstructed anomalous eddy currents, the rock mass dielectric constant (a function of the bulk porosity) and conductivity (a function of the style of pore or fracture interconnection) can be computed as $$\frac{\epsilon_{2m}}{\epsilon_0} = \frac{|\epsilon_1|}{\epsilon_0} + \frac{1}{k_0^2} R_e \frac{X_m}{\phi_2(\xi_m)} \quad (7)$$

and $$\sigma_{2m} = \sigma_1 + \frac{1}{|\omega|\mu_0} I_m \frac{X_m}{\phi_2(\xi_m)}$$

In the following section titled "VECTOR Elastic Geotomography" is a discussion of the use of algorithms to obtain useful elastic properties. Preferably, the dynamic elastic modulus and dynamic Young's modulus are obtained. This information is very useful in the determination of a geological fault or fracture using complex geotomography.

VECTOR ELASTIC GEOTOMOGRAPHY

The original SBIR solicitation sought imaging techniques capable of yielding information on rock mass elastic properties. VECTOR-geotomography, however, is derived for the reconstruction of scattered electromagnetic wavefields. Nevertheless, we will show in this appendix that the VECTOR, TENSOR, and STAR algorithms can be applied in a straightforward manner to imaging systems employing seismic waves. The elastic wave equation satisfies the following:

$$(\nabla^2 + k_\alpha^2)\phi = -F(x,y,z) \quad (B.1)$$

and $$(\nabla^2 + k_\beta^2)\psi = -F^*(x,y,z)$$

where F(x,y,z) is the source density distribution, $\phi$ is the compressional wave potential, $\psi$ is the shear wave potential, $k_\alpha$ is the compressional wavenumber given by $k_\alpha = \omega/V_p = \omega[(\lambda+2\mu)/\rho]^{-\frac{1}{2}}$, $k_\beta$ is the shear wavenumber given by $k_\beta = \omega[\mu/\rho]^{-\frac{1}{2}}$, $\lambda$ and $\mu$ are Lame's constants, $\omega$ is the angular frequency, and $\rho$ is the density. Using the Green's function approach we can derive the same equation for the elastic and electromagnetic case, that is equation (1) as $$\phi_2 = \phi_1 - \omega^2 \int_A g(x,y;x'y') \phi_2 [k_{\alpha 2}^2 - k_{\alpha 1}^2] dA' \quad (B.2)$$

and $$\psi_2 = \psi_1 - \omega^2 \int_A g(x,y;x'y') \psi_2 [k_{\beta 2}^2 - k_{\beta 1}^2] dA'$$

If now we assume that the region of propagation can be subdivided into cells small enough so that $k_{\alpha 2}$, $k_{\beta 2}$, $\phi_2$, and $\psi_2$ are constant within each, we have $$\phi_2 = \phi_1 - \sum_{m=1}^{M} (k_{\alpha m2}^2 - k_{\alpha 1}^2) \phi_2(\xi_m) \int_\infty^\infty g(x,x') \rho_m(x') dx' \quad (B.3)$$

and $$\psi_2 = \psi_1 - \sum_{m=1}^{M} (k_{\beta m2}^2 - k_{\beta 1}^2) \psi_2(\xi_m) \int_\infty^\infty g(x,x') \rho_m(x') dx'$$

Please refer to equation A.3 for definitions of $\rho_m$ and $\xi_m$. Changing to circular cells of radius "a" to evaluate the integral in equation B.3 one obtains $$\phi_2 = \phi_1 - \sum_{m=1}^{M} (k_{\alpha m2}^2 - k_{\alpha 1}^2) \phi_2(\xi_m) H_o(k_{\alpha 1} R_m) \frac{i\pi a^2}{2} \frac{J_1(k_{\alpha 1}a)}{k_{\alpha 1}a} \quad (B.4)$$

and $$\psi_2 = \psi_1 - \sum_{m=1}^{M} (k_{\beta m2}^2 - k_{\beta 1}^2) \psi_2(\xi_m) H_o(k_{\beta 1} R_m) \frac{i\pi a^2}{2} \frac{J_1(k_{\beta 1}a)}{k_{\beta 1}a}$$

Letting the following equalities hold $$Y = (\phi_2 - \phi_1) \frac{2 ik_{\alpha 1}a}{i\pi a^2 J_1(k_{\alpha 1} a)} \text{ or } Y = (\psi_2 - \psi_1) \frac{2ik_{\beta 1}a}{i\pi a^2 J_1(k_{\beta 1}a)},$$

$$X = (k_{\alpha m2}^2 - k_{\alpha 1}^2) \phi_1(\xi_m) \text{ or } X = (k_{\beta m2}^2 - k_{\beta 1}^2) \psi_2(\xi_m),$$

and $$A = H_o(k_{\alpha 1} R_m) \text{ or } A = H_o(k_{\beta 1} R_m)$$

one arrives at an equation equivalent to equation (6).

If we assume a viscoelastic medium with solid friction damping C (small compared to the elastic moduli) we can compute the following dynamic elastic parameters given the density $\rho$ Shear modulus $\mu = \mu\omega^2/k_\beta^2 \quad (B.5)$ -continued Lame's constant $\lambda = \rho\omega^2(k_\beta^2 - 2k_\alpha^2)/k_\alpha^2 k_\beta^2)$ Bulk modulus $K = \lambda + (2/3)\mu$ Young's modulus $E = \left( \dfrac{\dfrac{3(\lambda + 2\mu)}{\mu} - 4}{\dfrac{\lambda + 2\mu}{\mu} - 1} \right)$ Poisson's ratio $\nu = \lambda/(\lambda + \mu)$ The correspondence between wavelength and frequency is given by $$\text{Wavelength} = \frac{\text{Wave Velocity}}{\text{Frequency}}$$

While only a few embodiments of the present invention have been shown and described herein, it will be apparent to those skilled in the art that various modifications and changes can be made in the method of obtaining high resolution information regarding the physical properties of subsoil structure in the plane between two or more spaced-apart boreholes without departing from the spirit and scope of the present invention. All such modifications and changes coming within the scope of the appended claims are intended to be covered thereby.

We claim:

1. An improved method for obtaining high resolution information regarding the dielectric and conductivity properties of subsoil structure in the plane between at least two spaced apart boreholes, which method comprises:
    placing at least one electromagnetic radiation transmitter in at least one borehole;
    placing at least one electromagnetic radiation receiver in at least one borehole;
    activating at least one of the electromagnetic radiation transmitters using wavelengths of $10^8$ meters or less;
    receiving continuously at least at one of the electromagnetic radiation receivers, the electromagnetic radiation signal which originates from the electromagnetic radiation transmitter;
    processing by a linear approximation the electromagnetic radiation signal continuously received at least at one receiver as a result of the transmission of the at least one transmitter; and
    determining both the amplitude and phase of the received electromagnetic signal to obtain simultaneously the dielectric constant and the conductivity of the subsoil between the at least two boreholes.

2. The method of claim 1 including the step of providing two or more spaced apart boreholes separated by between about 5 and 1,000 meters.

3. The method of claim 1 including the step of providing two or more spaced apart boreholes separated by about 100 meters.

4. The method of claim 1 wherein the transmitted electromagnetic radiation has a wavelength of between about 0.1 m and 10,000 m.

5. The method of claim 4 wherein the transmitted electromagnetic radiation has a wavelength of between about 0.5 m and 1,000 m.

6. The method of claim 1 wherein the transmitted electromagnetic radiation has a frequency of between about 2000 Hz and 1000 MHz.

7. The method of claim 6 wherein the transmitted electromagnetic radiation has a frequency of between about 10,000 Hz and 500 MHz.

8. An improved method for obtaining high resolution information regarding the dielectric and conductivity properties of subsoil structure in the plane between two or more spaced apart boreholes, which method comprises:
    (A) placing at least one electromagnetic radiation transmitter in at least one borehole;
    (B) placing at least one electromagnetic radiation receiver in at least one other second borehole;
    (C) activating at least one of the electromagnetic radiation transmitters having a wavelength of $10^8$ meters or less;
    (D) receiving continuously at least at one the electromagnetic radiation receivers, the electromagnetic radiation signal which originates from the electromagnetic radiation transmitter;
    (E) moving the at least one electromagnetic radiation receiver to one or more other positions within the at least one other second borehole;
    (F) repeating steps (C) and (D) at least at one additional location within the receiver borehole; and
    (G) determining by linear approximation both the amplitude and phase of the received electromagnetic signal to obtain simultaneously the dielectric constant and the conductivity of the subsoil.

9. The method of claim 8 wherein the transmitted electromaagnetic radiation has a wavelength of between about 0.1 m and 10,000 m.

10. The method of claim 9 wherein the transmitted electromagnetic radiation has a wavelength of between about 0.5 m and 1,000 m.

11. The method of claim 8 wherein the transmitted electromagnetic radiation has a frequency of between about 2000 Hz and 1000 MHz.

12. The method of claim 11 wherein the transmitted electromagnetic radiation has a frequency of between about 10,000 Hz and 500 MHz.

13. An improved method for obtaining high resolution information regarding the dielectric and conductivity properties of subsoil structure, the method comprising:
    (a) boring at least two spaced apart boreholes;
    (b) analyzing the subsoil recovered from the boreholes to obtain at least the dielectric constants and conductivity properties of the recovered subsoil;
    (c) placing at least one electromagnetic radiation transmitter in at least one borehole;
    (d) placing at least one electromagnetic radiation receiver in at least one borehole;
    (e) activating at least one of the electromagnetic radiation transmitters having a wavelength of $10^8$ meters or less;
    (f) receivig continuously at least one of the electromagnetic radiation receivers, the electromagnetic radiation signal which originates from the electromagnetic radiation transmitter;
    (h) determining simultaneously by using linear approximation both the amplitude and phase of the received electromagnetic signal to obtain the dielectric constant and the conductivity of the subsoil between the at least two boreholes;

(i) comparing the dielectric constants and conductivity determined in step (h) with the dielectric constants and conductivity obtained from the analysis of the subsoil recovered in step (b).

14. The method of claim 13 wherein step of boring the at least two boreholes includes the substep of placing the boreholes within about 5 to 1,000 meters of each other.

15. The method of claim 14 wherein the electromagnetic radiation wavelength is between about 0.1 m and 10,000 m.

16. The method of claim 14 wherein the electromagnetic radiation frequency is between abut 200 Hz and 1000 MHz.

17. The method of claim 13 wherein step of boring the at least two boreholes includes the substep of placing the boreholes within about 5 and 200 meters of each other.

18. The method of claim 13 for determining dielectric constant and conductivity of subsoil components wherein said subsoil components are selected from one of the following coal deposits, oil shale deposits, petroleum deposits, mineral deposits, organic chemical contaminants, inorganic chemical contaminants, fractures, geologic structure and stratigraphy, faults, fresh water, saline water, or buried objects.

19. An improved method for obtaining high resolution information regarding the dielectric and conductivity properties of subsoil structure, the method comprising the steps of:
  (a) boring at least two spaced apart boreholes;
  (b) analyzing the subsoil recovered from the boreholes to obtain at least the dielectric constants and conductivity properties of the recovered subsoil;
  (c) placing at least one electromagnetic radiation transmitter in at least one borehole;
  (d) placing at least one electromagnetic radiation receiver in at least one other second borehole;
  (e) activating at least one of the electromagnetic radiation transmitters having a wavelength of $10^8$ meters or less;
  (f) receiving continuously at least at one the electromagnetic radiation receivers, the electromagnetic radiation signal which originates from the electromagnetic radiation transmitter;
  (g) moving the at least one electromagnetic radiation receiver to one or more other positions within the at least one other second borehole;
  (h) repeating steps (e) and (f) at least at one additional location within the receiver borehole;
  (i) determining simultaneously by linear approximation both the amplitude and phase of the received electromagnetic signal to obtain the dielectric constant and the conductivity of the subsoil; and
  (j) comparing the dielectric constants and conductivity determined in step (i) with the dielectric constants and conductivity obtained from the analysis of the subsoil recovered in step (b).

20. The method of claim 19 wherein the step of boring the at least two boreholes includes the substep of placing the boreholes within about 5 to 1,000 meters of each other.

21. The method of claim 19 wherein the step of boring the at least two boreholes includes the substep of placing the boreholes within about 5 to 200 meters of each other.

22. The method of claim 19 wherein the electromagnetic radiation wavelength is between about 0.1 m and 10,000 m.

23. The method of claim 19 for determining dielectric constant and conductivity of subsoil components wherein said subsoil components are selected from one of the following coal deposits, oil shale deposits, petroleum deposits, mineral deposits, organic chemical contaminants, inorganic chemical contaminants, fractures, faults, geologic structure and geologic stratigraphy, fresh water, saline water, or buried objects.

24. The method of claim 19 wherein the electromagnetic radiation frequency is between about 200 Hz and 1000 MHz.

* * * * *